(12) United States Patent
Noh et al.

(10) Patent No.: US 12,453,305 B2
(45) Date of Patent: Oct. 28, 2025

(54) MOBILE ROBOT SYSTEM AND BOUNDARY INFORMATION GENERATION METHOD FOR MOBILE ROBOT SYSTEM

(71) Applicant: LG ELECTRONICS INC., Seoul (KR)

(72) Inventors: Dongki Noh, Seoul (KR); Seungmin Baek, Seoul (KR); Jaekwang Lee, Seoul (KR); Jeongwoo Ju, Seoul (KR); Jaemin Lee, Seoul (KR); Sungyeon Park, Seoul (KR); Minkuk Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 308 days.

(21) Appl. No.: 17/777,732

(22) PCT Filed: Oct. 22, 2020

(86) PCT No.: PCT/KR2020/014477
§ 371 (c)(1),
(2) Date: May 18, 2022

(87) PCT Pub. No.: WO2021/101090
PCT Pub. Date: May 27, 2021

(65) Prior Publication Data
US 2023/0024763 A1    Jan. 26, 2023

(30) Foreign Application Priority Data
Nov. 20, 2019  (KR) ........................ 10-2019-0149518

(51) Int. Cl.
*A01D 34/00*  (2006.01)
*A01D 101/00*  (2006.01)
*G05D 1/00*  (2006.01)

(52) U.S. Cl.
CPC .......... *A01D 34/008* (2013.01); *G05D 1/0248* (2013.01); *A01D 2101/00* (2013.01)

(58) Field of Classification Search
CPC . A01D 34/008; A01D 2101/00; G05D 1/0248
See application file for complete search history.

(56) References Cited

U.S. PATENT DOCUMENTS

2015/0328775 A1    11/2015  Shamlian et al.
2016/0100522 A1*   4/2016   Yamauchi ............ G05D 1/0219
                                                        701/25
(Continued)

FOREIGN PATENT DOCUMENTS

CN    202795052        3/2013
DE    10302908 A1 *    8/2004  .......... A01D 34/008
(Continued)

OTHER PUBLICATIONS

Sprute et al., "This Far, No Further: Introducing Virtual Borders to Mobile Robots Using a Laser Pointer", Aug. 21, 2017 (Year: 2017).*

(Continued)

*Primary Examiner* — Dale W Hilgendorf
*Assistant Examiner* — Hana Lee
(74) *Attorney, Agent, or Firm* — KED & ASSOCIATES, LLP

(57) ABSTRACT

The present specification relates to a mobile robot system and a boundary information generation method for the mobile robot system, the mobile robot system comprising a signal processing device that comprises a receiving tag for receiving a transmission signal and a distance sensor, so as to recognize coordinate information about a spot at which the point of the distance sensor is designated on the basis of the reception result of the receiving tag and the distance measurement result of the distance sensor, thereby generat- (Continued)

ing boundary information according to the path designated as the point of the distance sensor on the basis of the recognized coordinate information.

14 Claims, 11 Drawing Sheets

(56) References Cited

U.S. PATENT DOCUMENTS

| | | |
|---|---|---|
| 2016/0366818 A1 | 12/2016 | Ouyang |
| 2017/0150676 A1 | 6/2017 | Yamauchi et al. |
| 2019/0320866 A1* | 10/2019 | Thorne ................ A47L 9/2852 |
| 2021/0064043 A1* | 3/2021 | Kulkarni ................ G05D 1/028 |
| 2021/0100160 A1* | 4/2021 | Kang ................ G05D 1/0219 |

FOREIGN PATENT DOCUMENTS

| | | |
|---|---|---|
| EP | 3 495 910 | 6/2019 |
| JP | 2016-152004 | 8/2016 |
| KR | 10-2019-0064253 | 6/2019 |
| KR | 10-2019-0123674 | 11/2019 |

OTHER PUBLICATIONS

European Search Report issued in Application No. 20891067.9 dated Oct. 13, 2023.
XP055642090; "This Far, No Further: Introducing Virtual Borders to Mobile Robots Using a Laser Pointer"; 2019 Third IEEE International Conference On Robotic Computing; Aug. 21, 2017; Dennis Sprute; Klaus Tönnies; and Matthias König; 8 pages.
International Search Report dated Feb. 2, 2021 issued in Application No. PCT/KR2020/014477.
Korean Office Action dated Jun. 25, 2021 issued in Application No. 10-2019-0149518.
Korean Notice of Allowance dated Dec. 21, 2021 issued in Application No. 10-2019-0149518.

* cited by examiner

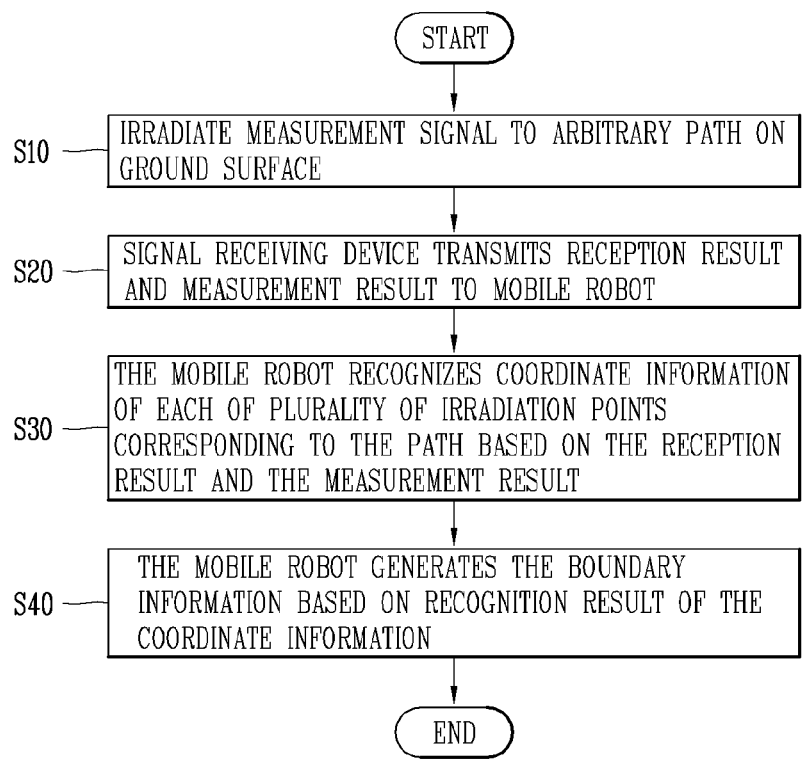

MOBILE ROBOT SYSTEM AND BOUNDARY INFORMATION GENERATION METHOD FOR MOBILE ROBOT SYSTEM

CROSS-REFERENCE TO RELATED PATENT APPLICATIONS

This application is a U.S. National Stage Application under 35 U.S.C. § 371 of PCT Application No. PCT/KR2020/014477, filed Oct. 22, 2020, which claims priority to Korean Patent Application No. 10-2019-0149518, filed Nov. 20, 2019, whose entire disclosures are hereby incorporated by reference.

TECHNICAL FIELD

An embodiment of the present disclosure relates to a mobile robot system that autonomously drives in a driving region, and a method for generating boundary information of the mobile robot system.

BACKGROUND ART

In general, a mobile robot is a device that automatically performs a predetermined operation while driving by itself in a predetermined area without a user's manipulation. The mobile robot senses an obstacle located in the area to perform an operation by moving closer to or away from the obstacle.

Such a mobile robot may include a mobile robot that mows the lawn on a ground surface of a region as well as a cleaning robot that performs cleaning while driving in the region. In general, a mobile robot device may include a riding type device that mows the lawn or weeds the grass on the ground while moving according to a user's operation when the user rides on the device, and a walk-behind type or hand type device that mows the lawn while moving when the user manually pulls or pushes the device. Such a mobile robot device is moved by the user's direct manipulation to mow the lawn, so there is an inconvenience in that the user must directly operate the device. Accordingly, a mobile robot-type mobile robot device having an element capable of mowing the lawn in a mobile robot is being studied.

In the case of such a mobile robot for a lawn mower (lawn mower), since it operates outdoors rather than indoors, it drives over a wider region than a mobile robot that drives in an indoor environment. In the case of indoors, the ground is monotonous, and factors such as terrain/objects that affect driving are limited, but in the case of outdoors, there are various factors that affect driving, and the terrain is greatly affected. In particular, since the mobile robot may drive in an unrestricted wide region due to the nature of an outdoor region, it is essential to set a driving region for the mobile robot to drive. Therefore, it is essentially required to set a driving region for the mobile robot to drive, that is, to set a boundary region and to accurately recognize the boundary region.

On the other hand, U.S. Patent Publication No. 2017-0150676 (published date: Jun. 1, 2017) (hereinafter, referred to as a prior document) discloses a technology in which a plurality of beacons are installed at a boundary portion of the driving region to allow a robot to determine a relative position with respect to the beacons based on a signal transmitted from the beacons while driving along the boundary, and store coordinate information thereof so as to use the stored information for position determination. In other words, according to the prior document, signals are transmitted and received to and from the plurality of beacons distributed at the boundary portion of the driving region to set the driving region based on the transmission and reception result, thereby performing accurate driving region/position recognition using relative position information with respect to the plurality of beacons. Due to this, it may be possible to partially overcome the limitation of the position recognition of the mobile robot system.

However, in the prior document, the boundary region is set only by simply installing a beacon, and there is a limitation in which boundary setting can only be made in a limited way. Furthermore, since the boundary region is set only according to the installation state of the beacon, there is also a concern that boundary formation may be performed inaccurately depending on the communication performance of the beacon. That is, there is a limitation in which it is difficult to set a boundary according to a user's request and accurately set a boundary with a boundary setting technology in the related art. As a result, in the related art, a technology for performing an accurate and convenient boundary setting according to a user's request has not been proposed, and due to this, there is a problem in that the usability, safety, reliability and convenience of the mobile robot is inevitably limited.

DISCLOSURE OF INVENTION

Technical Problem

The present disclosure is intended to provide an embodiment of a mobile robot system capable of overcoming the limitation of the related art as described above, and a method of generating boundary information of the mobile robot system.

Specifically, the present disclosure is intended to provide an embodiment of a mobile robot system capable of simply and conveniently acquiring boundary information of a driving region of a mobile robot, and a method of generating boundary information of the mobile robot system.

In addition, the present disclosure is intended to provide an embodiment of a mobile robot system capable of arbitrarily and accurately performing boundary setting of a driving region, and a method of generating boundary information of the mobile robot system.

Solution to Problem

An embodiment of the present disclosure for solving the foregoing problem is to designate a boundary region as a point of a distance sensor, and generate boundary information according to a designated path using a distance value of the distance sensor as a solution to the problem.

Specifically, a signal processing device including a receiving tag that receives a transmission signal and a distance sensor may be provided to recognize coordinate information at a position designated by a point of the distance sensor based on a reception result of the receiving tag and a distance measurement result of the distance sensor to generate boundary information according to a path designated as the point of the distance sensor based on the recognized coordinate information.

That is, a mobile robot system and a method of generating boundary information of the mobile robot system of the present disclosure may designate a boundary region through a signal processing device including a receiving tag that receives a transmission signal and a distance sensor, and recognize coordinate information corresponding to a designated path based on a reception result of the receiving tag and a measurement result of the distance sensor to generate boundary information based on the recognized coordinate information, thereby setting a boundary region.

Through such technical features, a mobile robot system and a method of generating boundary information of the mobile robot system provided in the present disclosure may generate boundary information by the point designation of a signal processing device, thereby solving the foregoing problems.

The foregoing technical features may be applied and implemented to a lawn mower robot, a control method of the lawn mower robot, a lawn mower robot system, a control system of the lawn mower robot, a method of controlling the lawn mower robot, a method of setting a boundary region of the lawn mower robot, a method of generating/acquiring boundary information of the lawn mower robot system, and the like, and the present disclosure provides an embodiment of a mobile robot system and a method of generating boundary information of the mobile robot system using the foregoing technical features as a problem solving means.

An embodiment of a mobile robot system of the present disclosure having the technical feature as a means of solution may include a plurality of transmitters installed in a boundary region of a driving region to transmit transmission signals, a signal receiving device that receives the transmission signal, and measures a distance to an irradiation point to which a measurement signal is irradiated based on a result of irradiating the measurement signal on a ground surface of the driving region, and a mobile robot that receives a reception result of the transmission signal and a measurement result of the distance from the signal receiving device to generate boundary information of the driving region in response to a path to which the measurement signal is irradiated on the ground surface based on the reception result and the measurement result.

In addition, an embodiment of a method of generating boundary information in a mobile robot system of the present disclosure having the technical feature as a means of solution, in the mobile robot system including a plurality of transmitters installed in a boundary region of a driving region to transmit transmission signals, a signal receiving device that receives the transmission signal, and measures a distance to an irradiation point to which a measurement signal is irradiated based on a result of irradiating the measurement signal on a ground surface of the driving region, and a mobile robot that receives a reception result of the transmission signal and a measurement result of the distance from the signal receiving device to generate boundary information of the driving region based on the reception result and the measurement result, may include irradiating the measurement signal to an arbitrary path on the ground surface, transmitting, by the signal receiving device, the reception result and the measurement result to the mobile robot during the irradiating step, recognizing, by the mobile robot, coordinate information of each of a plurality of irradiation points corresponding to the path based on the reception result and the measurement result, and generating, by the mobile robot, the boundary information based on the recognition result of the coordinate information.

Advantageous Effects of Invention

An embodiment of a mobile robot system and a method of generating boundary information of the mobile robot system of the present disclosure may generate boundary information by the point designation of a signal processing device to generate boundary information, thereby having an effect capable of simply and conveniently acquiring boundary information.

Accordingly, there is an effect capable of simply and conveniently performing the setting of a boundary region as well as arbitrarily and accurately performing the boundary setting of the boundary region.

In addition, an embodiment of a mobile robot system and a method of generating boundary information of the mobile robot system of the present disclosure may recognize coordinate information using a reception result and a measurement result of a signal processing device, thereby having an effect capable of performing various driving control and information processing operations.

Accordingly, the mobile robot system may be controlled in various and efficient ways, thereby having an effect capable of increasing the efficiency, usability, and utility of the mobile robot system.

BRIEF DESCRIPTION OF DRAWINGS

FIG. 11 is a flowchart according to an embodiment of a boundary generation method of the mobile robot system disclosed in the present disclosure.

MODE FOR THE INVENTION

Figure 1A:
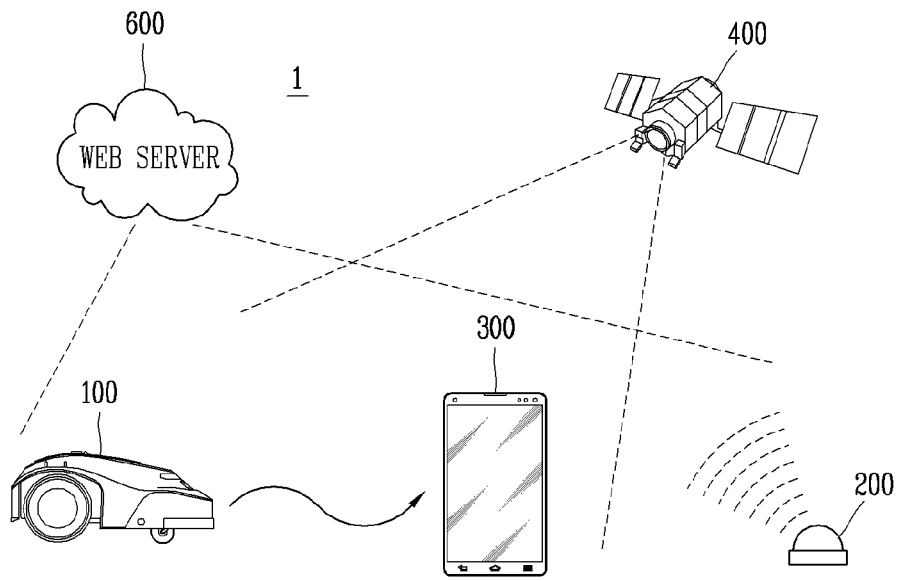
FIG. 1A is a conceptual diagram showing a driving principle of a mobile robot system.

Hereinafter, embodiments of a mobile robot system and a control method thereof will be described in detail with reference to the accompanying drawings, and the same or similar elements are designated with the same numeral references regardless of the numerals in the drawings and their redundant description will be omitted.

In describing the technology disclosed herein, moreover, the detailed description will be omitted when specific description for publicly known technologies to which the invention pertains is judged to obscure the gist of the technology disclosed in the present disclosure. Also, it should be noted that the accompanying drawings are merely illustrated to easily explain the concept of the technology disclosed in the present disclosure, and therefore, they should not be construed to limit the concept of the technology by the accompanying drawings.

Hereinafter, an embodiment of a mobile robot system (hereinafter, referred to as a system) will be described.

In the system, the mobile robot may refer to a robot capable of autonomous driving, a mobile lawn mower robot, a lawn mower robot, a lawn mower device, or a mobile robot for a lawn mower.

The system may be a system of a mobile robot (hereinafter, referred to as a robot) that cuts the grass in a driving region. Here, the robot may refer to a lawn mower robot, and accordingly, the system 1 may refer to a drive/control/operation system of the lawn mower robot that cuts the grass in a driving region.

As illustrated in FIG. 1A, the system 1 includes a terminal 300 that displays a control screen for an operation control of the robot 100 and the robot 100 operating in response to a manipulation of the control screen That is, the terminal 300 may display the control screen on which the control of the mobile robot 100 is performed on a display, and the mobile robot 100 may operate to cut the grass in the driving region while driving in the driving region according to a manipulation on the control screen. Furthermore, the system 1 may further include at least one of a transmitter 200 that transmits and receives signals to and from at least one of the robot 100 and the terminal 300, and a GPS satellite 400.

Figure 1B:
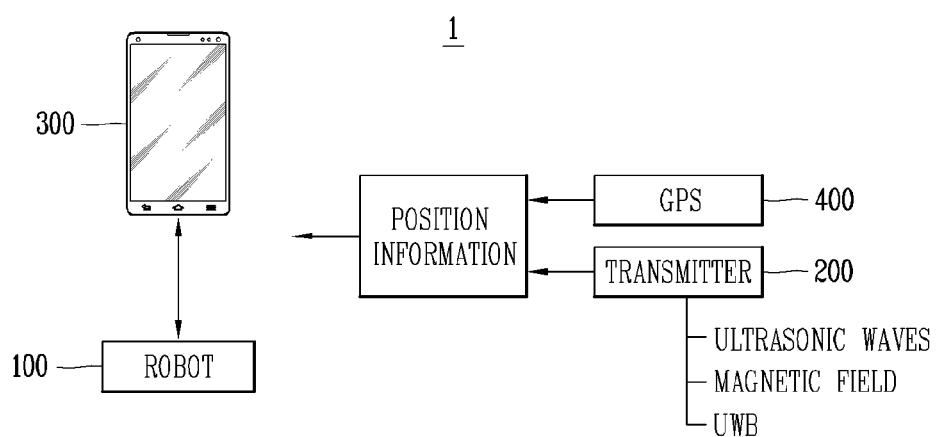
FIG. 1B is a conceptual diagram showing a signal flow between devices for determining a position of a mobile robot system.

In the system 1, the robot 100 may operate according to a driving principle as illustrated in FIG. 1A, and a signal flow between devices for position determination may be carried out as illustrated in FIG. 1B. Accordingly, the robot 100 may drive in a driving region 1000 as illustrated in FIG. 2.

Figure 2:
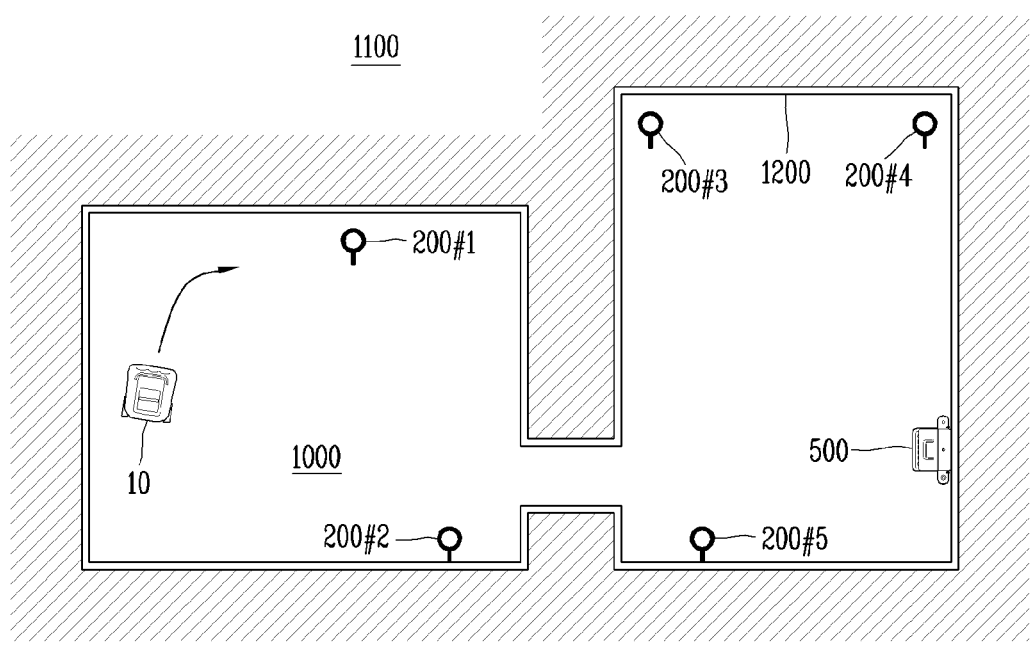
FIG. 2 is a conceptual diagram showing an embodiment of a driving region of a mobile robot.

The robot 100 may drive by itself within the driving region 1000 as illustrated in FIG. 2. The robot 100 may perform a specific operation while driving. Here, the specific operation may be an operation of cutting the lawn in the driving region 1000. The driving region 1000 is an area corresponding to a driving and operating target of the robot 100, and a predetermined outdoor/field area may be defined as the driving region 1000. For instance, a garden, a yard, or the like, for the robot 100 to cut the lawn may be defined as the driving region 1000. A charging device 500 for charging the driving power of the robot 100 may be provided in the driving region 1000, and the robot 100 may be docked to the charging device 500 provided in the driving region 1000 to charge driving power.

The driving region 1000 may be defined as a predetermined boundary region 1200 as illustrated in FIG. 2. The boundary region 1200 may correspond to a boundary line between the driving region 1000 and an outer region 1100, thereby allowing the robot 100 to be driven within the boundary region 1200 so as not to deviate from the outer region 1100. In this case, the boundary region 1200 may be defined as a closed curve or a closed loop. The boundary region 1200 may be set based on coordinate information on a map for the driving region 1000. In this case, the robot 100 may recognize the boundary region 1200 by recognizing a virtual boundary line based on the coordinate information. Furthermore, the boundary region 1200 may be set by a wire 1200 defined as a closed curve or a closed loop. In this case, the wire 1200 may be installed in any region, and the robot 100 may drive within the driving region 1000 of a closed curve defined by the installed wire 1200.

In addition, one or more transmitters 200 may be disposed in the driving region 1000 as illustrated in FIG. 2. The transmitter 200 is a signal generating element that transmits a signal for allowing the robot 100 to determine position information, and may be distributed and installed within the driving region 1000. The robot 100 may receive a transmission signal transmitted from the transmitter 200 to determine a current position based on the reception result, or may determine position information on the driving region 1000. In this case, the robot 100 may receive the transmission signal through a receiver that receives the transmission signal. The transmitter 200 may be preferably disposed in the vicinity of the boundary region 1200 in the driving region 1000. In this case, the robot 100 may determine the boundary region 1200 based on the placement position of the transmitter 200 disposed in the vicinity of the boundary region 1200.

The robot 100 may communicate with the terminal 300 moving in a predetermined region as illustrated in FIG. 1A, and may drive by following the position of the terminal 300 based on data received from the terminal 300. The robot 100 may set a virtual boundary in a predetermined area based on position information received from the terminal 300 or collected while driving by following the terminal 300, and set an inner area defined by the boundary as the driving region 1000. When the boundary region 1200 and the driving region 1000 are set, the robot 100 may drive within the driving region 1000 so as not to deviate from the boundary region 1200. In some cases, the terminal 300 may set the boundary region 1200 and transmit the set boundary region to the robot 100. When the area is changed or expanded, the terminal 300 may transmit the changed information to the robot 100 to allow the robot 100 to drive in a new area. Furthermore, the terminal 300 may display data received from the robot 100 on a screen to monitor the operation of the robot 100.

The robot 100 or the terminal 300 may receive position information to determine a current position. The robot 100 and the terminal 300 may determine the current position based on position information transmitted from the transmitter 200 disposed in the driving region 1000 or a GPS signal using the GPS satellite 400. The robot 100 and the terminal 300 may receive transmission signals transmitted from preferably three transmitters 200, and compare the signal reception results to determine the current position. In other words, three or more transmitters 200 may be preferably disposed in the driving region 1000.

The robot 100 sets any one point in the driving region 1000 as a reference position, and then calculates the position during movement as a coordinate. For example, the initial start position, the position of the charging device 500 may be set as a reference position, and furthermore, a coordinate with respect to the driving region 1000 may be calculated using a position of any one of the transmitters 200 as a reference position. In addition, the robot 100 may set an initial position as a reference position during each operation, and then determine the position while driving. The robot 100 may compute a driving distance with respect to the reference position, based on the number of rotations of the drive wheel 11, a rotational speed, and a rotational direction of the main body 10, and determine the current position within the driving region 1000 accordingly. Even in the case of determining position using the GPS satellite 400, the robot 100 may determine the position using any one point as a reference location.

As illustrated in FIG. 1B, the robot 100 may determine a current position based on position information transmitted from the transmitter 200 or the GPS satellite 400. The position information may be transmitted in the form of a GPS signal, an ultrasonic signal, an infrared signal, an electromagnetic signal, or an Ultra-Wide Band (UWB) signal. The transmission signal transmitted from the transmitter 200 may be preferably an Ultra-Wide Band (UWB) signal. Accordingly, the robot 100 may receive the UWB (Ultra-Wide Band) signal transmitted from the transmitter 200 to determine the current position based thereon.

Figure 3A:
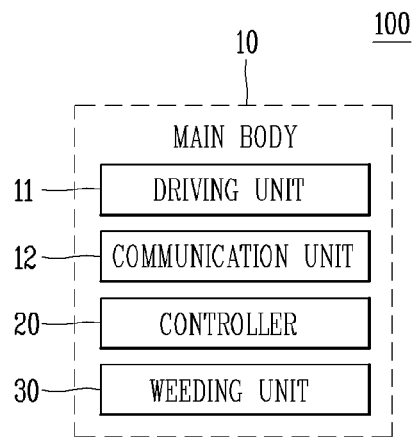
FIG. 3A is a block diagram A showing an embodiment of a mobile robot.
Figure 3B:
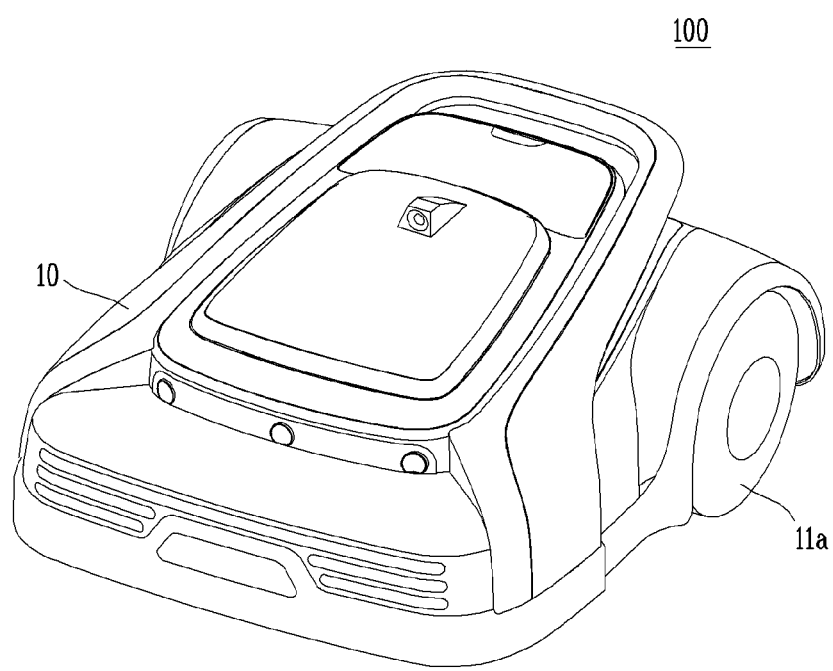
FIG. 3B is a configuration view B showing an embodiment of a mobile robot.
Figure 3C:
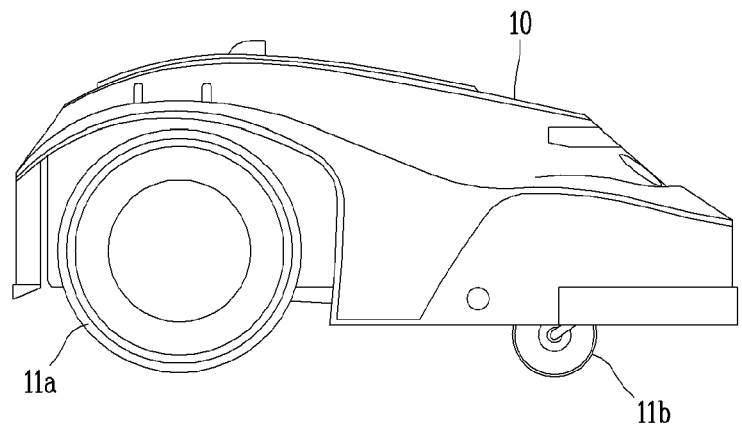
FIG. 3C is a configuration view C showing an embodiment of a mobile robot.

As illustrated in FIG. 3A, the robot 100 that cuts the grass while driving in the driving region 1000 may include a main body 10, a driving unit 11 that moves the main body 10, a communication unit 12 that communicates with a communication target element, a weeding unit 30 that cuts the grass on a ground surface while driving, and a controller 20 that controls the driving unit 11, the communication unit 12, and the weeding unit 30 to control the driving and weeding operation of the robot 100.

The robot 100 may be an autonomous driving robot including the main body 10 provided to be movable as illustrated in FIGS. 1B and 1C to cut the grass. The main body 10 defines an outer appearance of the robot 100, and is provided with at least one element for performing an operation such as driving of the robot 100 and cutting the lawn. The main body 10 is provided with the driving unit 11 capable of moving and rotating the main body 10 in a desired direction. The driving unit 11 may include a plurality of rotatable driving wheels, and each wheel may be rotated individually to allow the main body 10 to be rotated in a desired direction. More specifically, the driving unit 11 may include at least one main driving wheel 11a and an auxiliary wheel 11b. For example, the main body 10 may include two main driving wheels 11a, and the main driving wheels may be installed on a rear bottom surface of the main body 10.

The robot 100 may allow the controller 20 to determine a current position of the main body 10 and control the driving unit 11 to drive within the driving region 1000 so as to control the driving of the main body 10, and control the weeding unit 30 to cut the grass on a ground surface while the main body 10 drives in the driving region 1000 so as to control the driving and weeding operation of the robot 100.

Figure 4:
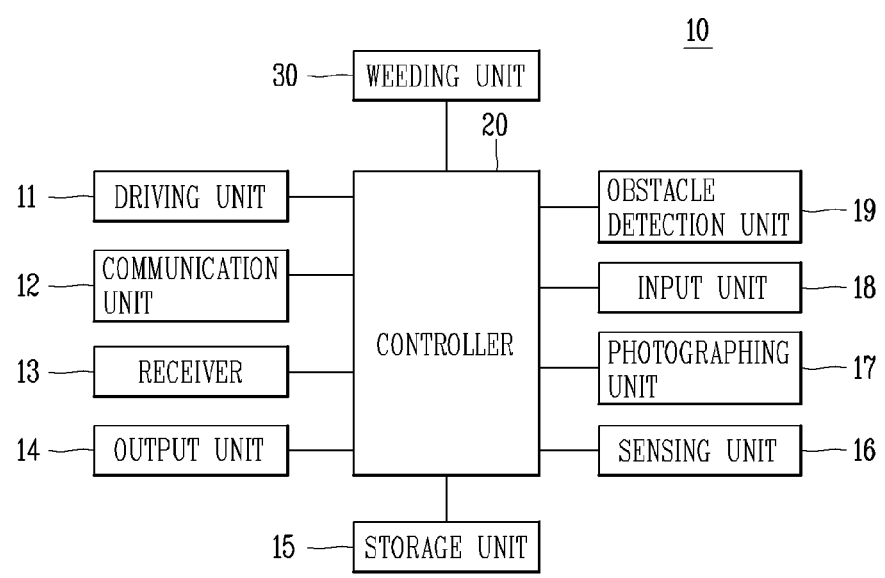
FIG. 4 is a detailed block diagram of a moving robot.

The robot 100 operating in this way, as illustrated in FIG. 4, may include the main body 10, the driving unit 11, the communication unit 12, the weeding unit 30, and the controller 20 to cut the grass while driving in the driving region 1000. Furthermore, the robot 100 may further include at least one of a receiver 13, an output unit 14, a storage unit 15, a sensing unit 16, a photographing unit 17, an input unit 18, and an obstacle detection unit 19.

The driving unit 11, which is a driving wheel provided at a lower portion of the main body 10, may be rotatably driven to move the main body 10. In other words, the driving unit 11 may operate to allow the main body 10 to be driven in the driving region 1000. The driving unit 11 may include at least one drive motor to move the main body 10 to allow the robot 100 to be driven. For instance, the driving unit 11 may include a left wheel drive motor that rotates a left wheel and a right wheel drive motor that rotates a right wheel.

The driving unit 11 may transmit information on a driving result to the controller 20, and receive a control command for an operation from the controller 20. The driving unit 11 may operate according to a control command received from the controller 20. In other words, the driving unit 11 may be controlled by the controller 20.

The communication unit 12 may communicate with one or more communication target elements that communicate with the robot 100. The communication unit 12 may communicate with the transmitter 200 and the terminal 300 in a wireless communication manner. The communication unit 12 may also be connected to a predetermined network to communicate with an external server or the terminal 300 controlling the robot 100. When communicating with the terminal 300, the communication unit 12 may transmit the generated map to the terminal 300, receive a command from the terminal 300, and transmit data on the operation state of the robot 100 to the terminal 300. The communication unit 12 may include a communication module such as Wi-Fi and WiBro, as well as short-range wireless communication such as ZigBee and Bluetooth to transmit and receive data.

The communication unit 12 may transmit information on a communication result to the controller 20, and receive a control command for an operation from the controller 20. The communication unit 12 may operate according to the control command received from the controller 20. In other words, the communication unit 12 may be controlled by the controller 20.

The receiver 13 may include a plurality of sensor modules for transmitting and receiving position information. The receiver 13 may include a position sensor module that receives the transmission signal from the transmitter 200. The position sensor module may transmit a signal to the transmitter 200. When the transmitter 200 transmits a signal using any one of an ultrasonic wave, UWB (Ultra-Wide Band), and an infrared ray, the receiver 13 may be provided with a sensor module that transmits and receives an ultrasonic, UWB, or infrared signal corresponding thereto. The receiver 13 may preferably include a UWB sensor. For reference, UWB radio technology refers to using a very wide frequency band of several GHz or more in a baseband without using a radio carrier (RF carrier). UWB radio technology uses very narrow pulses of several nanoseconds or several picoseconds. Since the pulses emitted from such a UWB sensor are several nanoseconds or several picoseconds, penetrability is good, and accordingly, very short pulses emitted from other UWB sensors may be received even when there are obstacles around them.

When the robot 100 drives by following the terminal 300, the terminal 300 and the robot 100 may each include a UWB sensor to transmit and receive a UWB signal to and from each other through the UWB sensor. The terminal 300 may transmit a UWB signal through a UWB sensor, and the robot 100 may determine the position of the terminal 300 based on the UWB signal received through the UWB sensor, and move by following the terminal 300. In this case, the terminal 300 operates at a transmitting side, and the robot 100 operates at a receiving side. When the transmitter 200 is provided with a UWB sensor to transmit a transmission signal, the robot 100 or the terminal 300 may receive a transmission signal transmitted from the transmitter 200 through the UWB sensor provided therein. In this case, a signal method of the transmitter 200 and a signal method of the robot 100 and the terminal 300 may be the same or different.

The receiver 13 may include a plurality of UWB sensors. When two UWB sensors are included in the receiver 17, for example, they may be provided at the left and right sides of the main body 10, respectively, to receive transmission signals, thereby comparing a plurality of received signals to calculate an accurate position. For example, when distances measured by the left sensor and the right sensor are different according to the positions of the robot 100 and the transmitter 200 or the terminal 300, a relative position between the robot 100 and the transmitter 200 or the terminal 300 and a direction of the robot 100 may be determined based thereon.

The receiver 13 may further include a GPS module that transmits and receives a GPS signal from the GPS satellite 400.

The receiver 13 may transmit a reception result of the transmission signal to the controller 20, and receive a control command for an operation from the controller 20. The receiver 13 may operate according to a control command received from the controller 20. In other words, the receiver 13 may be controlled by the controller 20.

The output unit 14, which is an output element for outputting information on the state of the robot 100 in the form of a voice, may include a speaker, for instance. When an event occurs during the operation of the robot 100, the output unit 14 may output an alarm related to the event. For example, when the driving power of the robot 100 is exhausted, a shock is applied to the robot 100, or an accident occurs on the driving region 1000, an alarm voice may be output to transmit information on the accident to the user.

The output unit 14 may transmit information on an operation state to the controller 20, and receive a control command for an operation from the controller 20. The output unit 14 may operate according to a control command received from the controller 20. In other words, the output unit 14 may be controlled by the controller 20.

The storage unit 15 may include a hard disk drive (HDD), a solid state disk (SSD), a silicon disk drive (SDD), a ROM, RAM, CD-ROM, a magnetic tape, a floppy disk, and an optical data storage device as a storage element for storing data that can be read by a microprocessor. In the storage unit 15, a received signal may be stored, reference data for determining an obstacle may be stored, and obstacle information on the sensed obstacle may be stored. In addition, control data for controlling the operation of the robot 100, data according to the operation mode of the robot 100, position information to be collected, information on the driving region 1000 and the boundary region 1200 may be stored in the storage unit 15.

The sensing unit 16 may include one or more sensors that sense information on the posture and operation of the main body 10. The sensing unit 16 may include at least one of a tilt sensor that senses a movement of the main body 10 and a speed sensor that senses a driving speed of the driving unit 11. The tilt sensor may be a sensor that senses the posture information of the main body 10. When the main body 10 is inclined in a front, rear, left, or right direction, the tilt sensor may calculate an inclined direction and angle thereof to sense the posture information of the main body 10. A tilt sensor, an acceleration sensor, or the like may be used for the tilt sensor, and any of a gyro type, an inertial type, and a silicon semiconductor type may be applied in the case of the acceleration sensor. Moreover, in addition, various sensors or devices capable of sensing the movement of the main body 10 may be used. The speed sensor may be a sensor that senses a driving speed of a driving wheel provided in the driving unit 11. When the driving wheel rotates, the speed sensor may sense the rotation of the driving wheel to detect the driving speed.

The sensing unit 16 may transmit information on a sensing result to the controller 20, and receive a control command for an operation from the controller 20. The sensing unit 16 may operate according to a control command received from the controller 20. In other words, the sensing unit 16 may be controlled by the controller 20.

The photographing unit 17 may be a camera for photographing the vicinity of the main body 10. The photographing unit 17 may photograph the vicinity of the main body 10 to generate image information on the driving region 1000 of the main body 10. The photographing unit 17 may photograph the front of the main body 10 to detect obstacles present in the vicinity of the main body 10 and on the driving region 1000. The photographing unit 17, which is a digital camera, may include an image sensor (not shown) and an image processing unit (not shown). The image sensor, which is a device that converts an optical image into an electrical signal, is composed of a chip in which a plurality of photo diodes are integrated, and a pixel is exemplified as a photo diode. Charges are accumulated in each of the pixels by an image formed on the chip by light passing through a lens, and the charges accumulated in the pixels are converted into an electrical signal (e.g., voltage). As an image sensor, CCD (Charge Coupled Device), CMOS (Complementary Metal Oxide Semiconductor), or the like are well known. In addition, the photographing unit 12 may include the image processing unit (DSP) that generates the image information through image processing on the photographed result.

The photographing unit 17 may transmit a reception result to the controller 20, and receive a control command for an operation from the controller 20. The photographing unit 17 may operate according to a control command received from the controller 20. In other words, the photographing unit 17 may be controlled by the controller 20.

The input unit 18 may include an input element such as at least one button, a switch, and a touch pad, and an output element such as a display module to receive a user command and output an operation state of the robot 100. For example, a command for the execution of the monitoring mode may be input through the display, and a state for the execution of the monitoring mode may be output.

The input unit 18 may display a state of the robot 100 through the display, and display a control screen on which a control operation of the robot 100 is carried out. The control screen may refer to a user interface screen on which a driving state of the robot 100 is displayed, and to which a command for a driving operation of the robot 100 is input from a user. The control screen may be displayed on the display through the control of the controller 20, and the display on the control screen, the input command, and the like may be controlled by the controller 20.

The input unit 18 may transmit information on an operation state to the controller 20, and receive a control command for an operation from the controller 20. The input unit 18 may operate according to a control command received from the controller 20. In other words, the input unit 18 may be controlled by the controller 20.

The obstacle sensing unit 19 includes a plurality of sensors to sense an obstacle existing in a driving direction. The obstacle sensing unit 19 may sense an obstacle in front of the main body 10, that is, in a driving direction, using at least one of laser, ultrasonic, infrared, and 3D sensors. The obstacle sensing unit 19 may further include a cliff detection sensor provided on a rear surface of the main body 10 to sense a cliff.

The obstacle detection unit 19 may transmit information on a detection result to the controller 20, and receive a control command for an operation from the controller 20. The obstacle sensing unit 19 may operate according to a control command received from the controller 20. In other words, the obstacle sensing unit 19 may be controlled by the controller 20.

The weeding unit 30 mows the lawn on the ground surface while driving. The weeding unit 30 may be provided with a brush or blade for mowing the lawn to mow the lawn on the bottom through rotation.

The weeding unit 30 may transmit information on an operation result to the controller 20, and receive a control command for an operation from the controller 20. The weeding unit 30 may operate according to a control command received from the controller 20. In other words, the weeding unit 30 may be controlled by the controller 20.

The controller 20 may include a central processing unit to perform overall operation control of the robot 100. The controller 20 may determine the state of the driving region 1000 while driving in the driving region 1000 through the main body 10, the driving unit 11, and the photographing unit 17 to control the driving of the main body 10, and control the function/operation of the robot 100 to be performed through the communication unit 12, the receiver 13, the output unit 14, the storage unit 15, the sensing unit 16, the input unit 18, the obstacle detection unit 19, and the weeding unit 30.

The controller 20 may control the input/output of data, and control the driving unit 11 to allow the main body 10 to be driven according to a setting. The controller 20 may control the driving unit 11 to independently control the operation of the left wheel drive motor and the right wheel drive motor, thereby controlling the main body 10 to drive in a straight or rotating manner.

The controller 20 may set the boundary region 1200 based on position information received from the terminal 300 or position information determined based on a transmission signal received from the transmitter 200. The controller 20 may also set the boundary region 1200 based on position information collected by itself while driving. The controller 20 may set any one of regions defined by the set boundary region 1200 as the driving region 1000. The controller 20 may connect discontinuous position information with a line or a curve to set the boundary 1200 in a closed loop shape, and set an inner region thereof as the driving region 1000. When the driving region 1000 and the boundary region 1200 are set, the controller 20 may control the driving of the main body 10 to be driven within the driving region 1000 so as not to deviate from the set boundary region 1200. The controller 20 may determine a current position based on the received position information, and control the driving unit 11 to allow the determined current position to be located within the driving region 1000 so as to control the driving of the main body 10.

In addition, the controller 20 may control the driving of the main body 10 to be driven by avoiding an obstacle according to obstacle information received by at least one of the photographing unit 17 and the obstacle detection unit 19. In this case, the controller 20 may modify the driving region 1000 by reflecting the obstacle information on area information previously stored for the driving region 1000.

When the boundary region 1200 is set during an initial setting for driving in the driving region 1000, the robot 100 may drive in the driving region 1000 based on the set information. Here, the setting of the boundary region 1200 is set based on a result of receiving the transmission signal from the transmitter 200 while the robot 100 autonomously drives in the driving region 1000, or carried out through communication between the robot 100 and the terminal 300.

Figure 5:
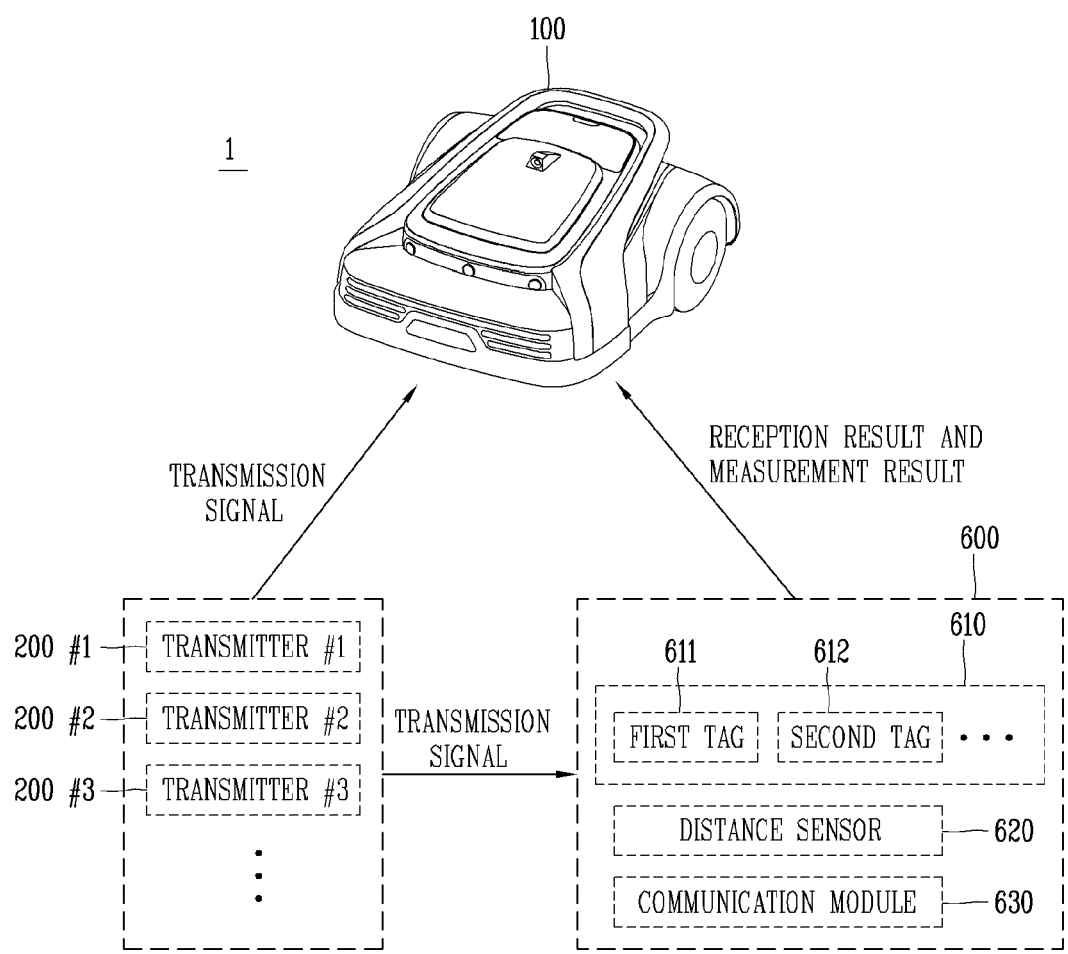
FIG. 5 is a configuration view according to an embodiment of a mobile robot system disclosed in the present disclosure.
Figure 6:
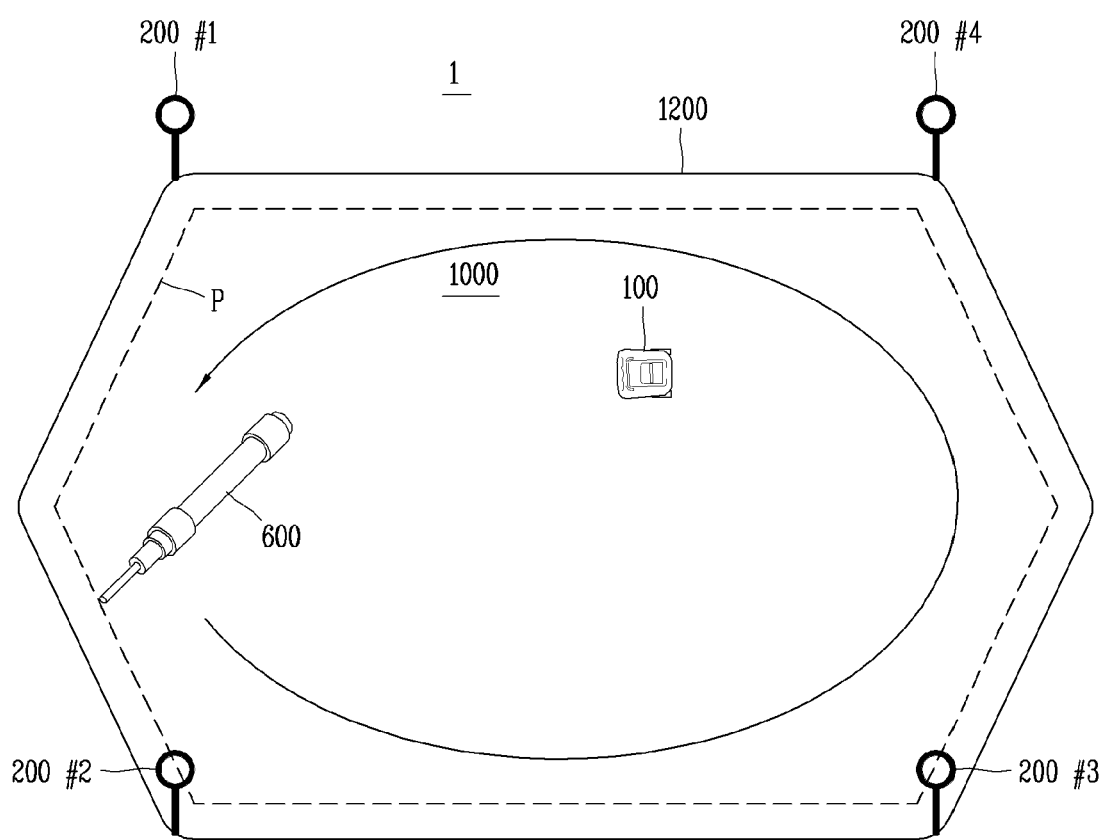
FIG. 6 is an exemplary view showing an example of a driving region according to an embodiment of the mobile robot system disclosed in the present disclosure.

The system 1, which is a system in which the setting of the boundary region 1200 is carried out as described above, includes a plurality of transmitters 200, a signal receiving device 600 (hereinafter referred to as a receiving device), and the robot 100 may be as illustrated in FIG. 5. That is, the system 1 is a mobile robot system including the plurality of transmitters 200, the receiving device 600, and the robot 100, and a specific embodiment thereof may be as illustrated in FIG. 6.

In the system 1, the plurality of transmitters 200 are installed in the boundary region 1200 of the driving region 1000 to transmit transmission signals. The plurality of transmitters 200 may be dispersedly installed in the boundary region 1200. For instance, as illustrated in FIG. 6, the plurality of transmitters 200 may be dispersedly installed at each corner of the boundary region 1200. Preferably, at least three of the plurality of transmitters 200 are dispersedly installed in the boundary region 1200 to transmit the transmission signals from the installed positions, respectively. As illustrated in FIG. 6, each of the plurality of transmitters 200 dispersedly installed in the boundary region 1200 may transmit the transmission signal, which is a basis for determining the position of the robot 100 and setting the boundary region 1200. The transmission signal transmitted from each of the plurality of transmitters 200 may be received by the receiving device 600 and the robot 100.

Figure 7:
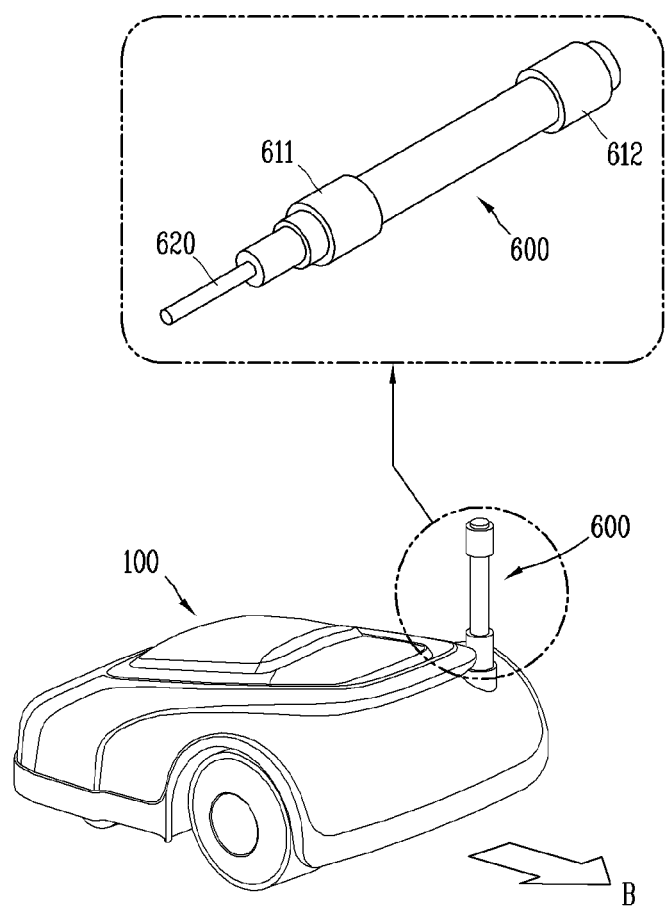
FIG. 7 is an exemplary view showing an example of a signal processing device according to an embodiment of the mobile robot system disclosed in the present disclosure.

In the system 1, the receiving device 600 receives the transmitted signal, and measures a distance to a point to which a measurement signal is irradiated based on a result of irradiating the measurement signal to a ground surface of the driving region 1000. The receiving device 600, which is a device for setting the boundary region 1200 in the system 1, may communicate with the plurality of transmitters 200 and the robot 100. The receiving device 600 may be formed in a rod shape. The receiving device 600, which is a device distinct from the robot 100, may have a configuration separate from the robot 100. Furthermore, as illustrated in FIG. 7, the receiving device 600 may be detachably attached to the robot 100. In this case, the receiving device 600 may be detachably attached to a rear side of the robot 100, and may correspond to a receiving element, for instance, an antenna that receives the transmission signal from the robot 100. The receiving device 600 may be configured to receive the transmission signal transmitted from each of the plurality of transmitters 200, irradiate the measurement signal on the ground surface to measure a distance to a point to which the measurement signal is irradiated based on the irradiation result, and transmit the reception result of the transmission signal and the measurement result of the distance to the robot 100. That is, the receiving device 600 may be a device that receives the transmission signal, irradiates the measurement signal to measure a distance, and transmits the reception result and the measurement result to the robot 100. The receiving device 600 may include a plurality of receiving tags (610: 611 and 612) provided at different positions to receive the transmitted signal, a distance sensor 620 that irradiates the measurement signal on the ground surface to measure a distance based on the irradiation result, and a communication module 630 that transmits the reception result of each of the plurality of receiving tags 610 and the measurement result of the distance sensor to the robot 100.

The plurality of receiving tags 610 may be provided at different positions of the receiving device 600 to receive the transmission signal at each of the provided positions. That is, the transmission signal may be received at different positions of the receiving device 600. The plurality of receiving tags 610 may include a first tag 611 provided at one side of the receiving device 600 and a second tag 612 provided at the other side of the receiving device 600. The first tag 611 may be provided at one side of the main body of the receiving device 600 to receive the transmission signal transmitted from each of the plurality of transmitters 200. The first tag 611 may be provided at a front side of the receiving device 600, for instance, at a position where the distance sensor 620 is provided. The second tag 612 is provided at the other side of the main body of the receiving device 600 opposite to the position where the first tag 611 is provided to receive the transmission signal transmitted from each of the plurality of transmitters 200. The second tag 612 may be provided at a rear side of the receiving device 600, for instance, opposite to the position where the distance sensor 620 is provided. Accordingly, the receiving device 600 may receive the transmission signal at each of one side and the other side of the main body of the receiving device 600 through the first tag 611 and the second tag 612. As such, the first tag 611 and the second tag 612 provided at each of one side and the other side of the receiving device 600 may be provided at positions corresponding to the same straight line. Furthermore, the first tag 611 and the second tag 612 may be provided at positions corresponding to the same straight line as the distance sensor 620. That is, the first tag 611, the second tag 612, and the distance sensor 620 may be provided at positions corresponding to the same straight line. Accordingly, a direction of a signal radiated from the distance sensor 620 may be the same as a direction from the first tag 611 to the second tag 612.

The distance sensor 620 may be provided at one side of the receiving device 600 to irradiate the measurement signal from one side of the receiving device 600. Here, the measurement signal may be a laser signal. That is, the distance sensor 620 may be a laser sensor that measures a distance between the ground surface irradiated with the laser sensor and the distance sensor 620 based on a result of irradiating the laser sensor on the ground surface. The distance sensor 620 may be provided in a protruding shape at a position where the first tag 611 provided at one side of the receiving device 600 among the plurality of receiving tags 610 is provided. When the receiving device 600 is detachably attached to the robot 100 as illustrated in FIG. 7, an irradiation unit to which the measurement signal is irradiated from the distance sensor 620 may be a coupling element for being fixedly coupled to the robot 100. The irradiation of the measurement signal may be performed through at least of a button, a sensor, and a separate operation element provided in the receiving device 600. For instance, when a signal irradiation button provided in the receiving device 600 is pressed, the measurement signal may be irradiated. Furthermore, the measurement signal may be continuously emitted while the signal irradiation button is pressed to perform the setting of the boundary region 1200 through the receiving device 600. When the measurement signal is arbitrarily irradiated to the ground surface by a user of the system 1, the distance sensor 620 may measure a distance between the distance sensor 620 and a point to which the measurement signal is irradiated based on the irradiation result of the measurement signal. In addition, when the measurement signal is continuously emitted to an arbitrary path on the ground surface, the distance sensor 620 may measure a distance to each of irradiation points included in the continuously emitted path. For instance, when the measurement signal is continuously emitted to an arbitrary path P along the boundary region 1200, a distance from each of a plurality of irradiation points included in the continuously emitted arbitrary path P may be measured.

The communication module 630 may be included in the receiving device 600 to transmit a reception result of the transmission signal of each of the first tag 611 and the second tag 612 and a measurement result of the distance sensor 620 to the robot 100. The communication module 630 may communicate with the robot 100 in real time. In this case, the communication module 630 may communicate with the communication unit 12 included in the robot 100. The communication module 630 may transmit the reception result and the measurement result to the robot 100 in a wireless communication method. The communication module 630 may transmit the reception result and the measurement result to the robot 100 in real time. For instance, the reception result and the measurement result while the position of the receiving device 600 is changed and the measurement signal is continuously emitted on the ground surface in a predetermined path may be transmitted to the robot 100 in real time. Accordingly, the robot 100 may receive the reception result and the measurement result whenever at least one of the position of the receiving device 600 and the irradiation point of the measurement signal is changed.

Figure 8:
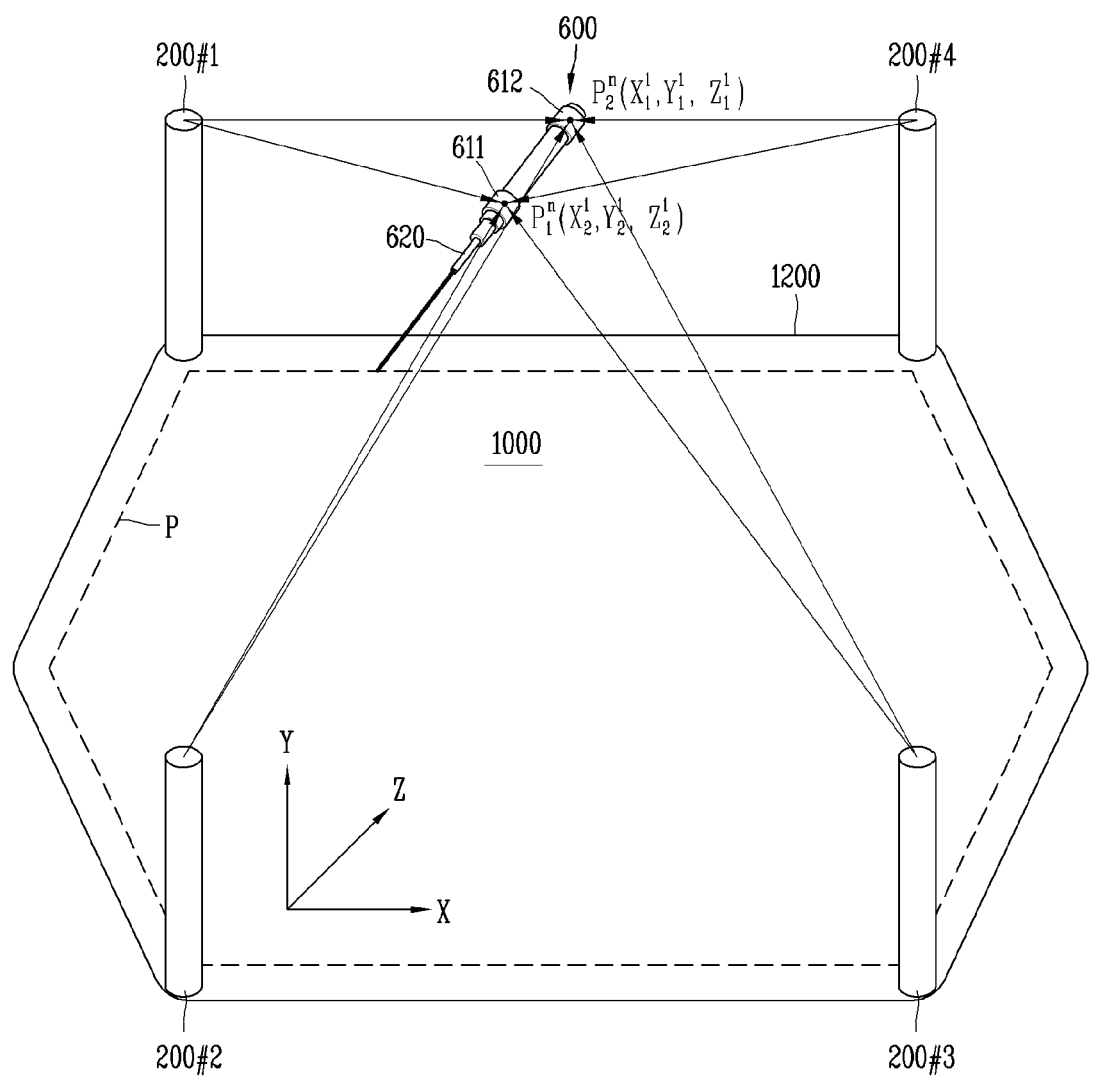
FIG. 8 is Exemplary View 1 for explaining a principle of recognizing coordinate information according to an embodiment of the mobile robot system disclosed in the present disclosure.

As such, the receiving device 600 including the plurality of receiving tags 610, the distance sensor 620, and the communication module 630 may receive the transmission signal, and measure a distance to each of irradiation points included in the path P to transmit the reception result and the measurement result to the robot 100 while the measurement signal is continuously emitted to an arbitrary path P on the ground surface along the boundary region 1200 by the user of the system 1 as illustrated in FIG. 8. Here, when the measurement signal is continuously emitted from the receiving device 600, the irradiation of the measurement signal may be performed along the path P while the receiving device 600 is fixed at any one position. For instance, the measurement signal may be continuously transmitted to the path P by manipulating the receiving device 600 while the user is positioned at any one point of the driving region 1000. In this case, a change of the reception result and a change of the measurement result may be carried out within a range corresponding to the rotation of the receiving device 600. When the measurement signal is continuously emitted from the receiving device 600, the irradiation of the measurement signal may be carried out along the path P while the position of the receiving device 600 is changed. For instance, the measurement signal may be continuously emitted to the path P by manipulating the receiving device 600 while the user moves along the path P. In this case, a change of the reception result and a change of the measurement result may be carried out within a range corresponding to a positional change of the receiving device 600.

Figure 9:
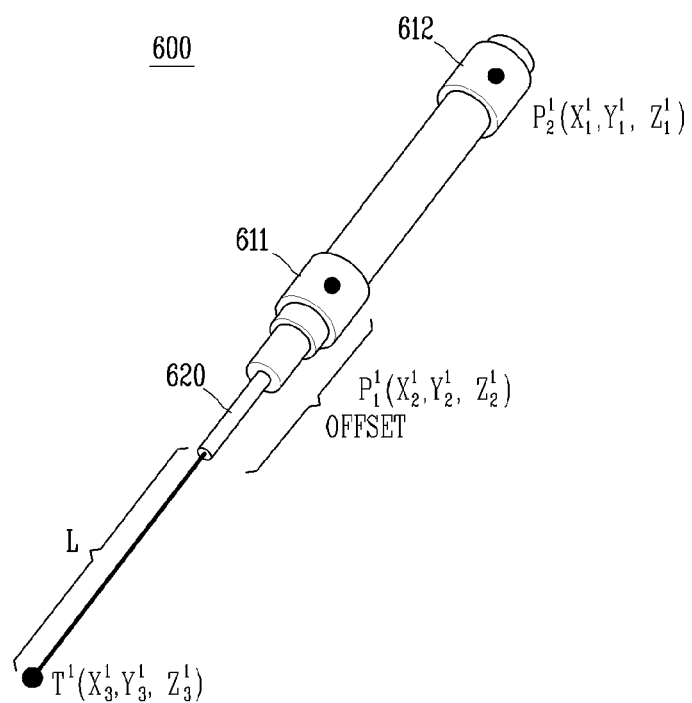
FIG. 9 is Exemplary View 2 for explaining a principle of recognizing coordinate information according to an embodiment of the mobile robot system disclosed in the present disclosure.

In the system 1, the robot 100 receives the reception result of the transmission signal and the measurement result of the distance from the receiving device 600 to generate boundary information of the driving region 1000 in response to a path where the measurement signal is irradiated on the ground surface based on the reception result and the measurement result. In this case, the robot 100 may receive the reception result and the measurement result through the communication unit 12 communicating with the receiving device 600. Here, the boundary information may refer to virtual boundary information set as the boundary region 1200. Accordingly, the robot 100 may set the boundary region 1200 according to the boundary information to drive in the driving region 1000. The boundary information may be coordinate information of a portion corresponding to the boundary region 1200 on the coordinate information based on any one point on the driving region 1000. The robot 100 may receive the reception result and the measurement result to quantify the reception result and the measurement result in a vector form. For instance, as illustrated in FIG. 8, a reception result of the first tag 611 may be quantified as a vector $P_1''$, a reception result of the second tag 612 as a vector $P_2''$, and a measurement result of the distance sensor 620 as a vector L. Here, each vector of the reception result and the measurement result may be quantified based on any one point on the driving region 1000. That is, each vector of the reception result and the measurement result may be quantified based on the same reference point. For instance, it may be quantified to correspond to coordinates based on any one transmitter 200 #2 among the plurality of transmitters 200. For a specific example, as illustrated in FIG. 9, on coordinates using the position of transmitter #2 (200 #2) as a reference (0, 0, 0), a reception result of the first tag 611 may be quantified as a vector $P_1''(X_2^1, Y_2^1, Z_2^1)$, a reception result of the second tag 612 as a vector $P_2''(X_1^1, Y_1^1, Z_1^1)$, and the measurement result as a vector $L(X_3^1, Y_3^1, Z_3^1)$. Accordingly, based on the reception result of the first tag 611, the reception result of the second tag 612, and the measurement result, which are vector information based on a predetermined point, the robot 100 may recognize coordinate information of an irradiation point to which the measurement signal is irradiated from the signal device 600.

When the measurement signal is continuously emitted to an arbitrary path P along the boundary region 1200 by the receiving device 600, the robot 100 may receive the reception result and the measurement result while the measurement signal is continuously emitted to the path P, and recognize the coordinate information of the irradiation point based on the reception result and the measurement result to generate the boundary information using the coordinate information.

The robot 100 may detect the irradiation direction of the measurement signal based on the reception result to recognize the coordinate information based on the irradiation direction and the measurement result. That is, the robot 100 may detect the irradiation direction of the measurement signal based on a result of receiving the transmission signal at the plurality of receiving tags 610, thereby determining the direction of the irradiation point to which the measurement signal is irradiated from the reception result, and determining a distance to which the measurement signal is irradiated from the measurement result to recognize the coordinate information based on the irradiation direction and the measurement result.

The robot 100 may determine the position information at which each of the plurality of receiving tags 610 has received the transmission signal based on the reception result to detect the irradiation direction based on the position information. That is, the robot 100 may detect a direction of the receiving device 600, that is, an irradiation direction in which the measurement signal is irradiated to the ground surface using positions of the first tag 611 and the second tag 612, which are respectively provided at different positions of the receiving device 600, but provided at positions corresponding to the same straight line with respect to the distance sensor 620. In this case, the robot 100 may calculate a vector between the position of the first tag 611 and the position of the second tag 612 to detect the irradiation direction.

The robot 100 may calculate coordinate values according to the measurement result using the irradiation direction, and reflect a separation length (offset) between a tag adjacent to the distance sensor 620 among the plurality of receiving tags 610 and the distance sensor 620 to the coordinate values to recognize the coordinate information. That is, the robot 100 may calculate coordinate values of the irradiation point based on the irradiation direction and the measurement result, and reflect a separation length (offset) between the first tag 611 and the distance sensor 620 to the coordinate values to recognize the coordinate information, thereby accurately recognizing the position of the irradiation point.

Figure 10A:
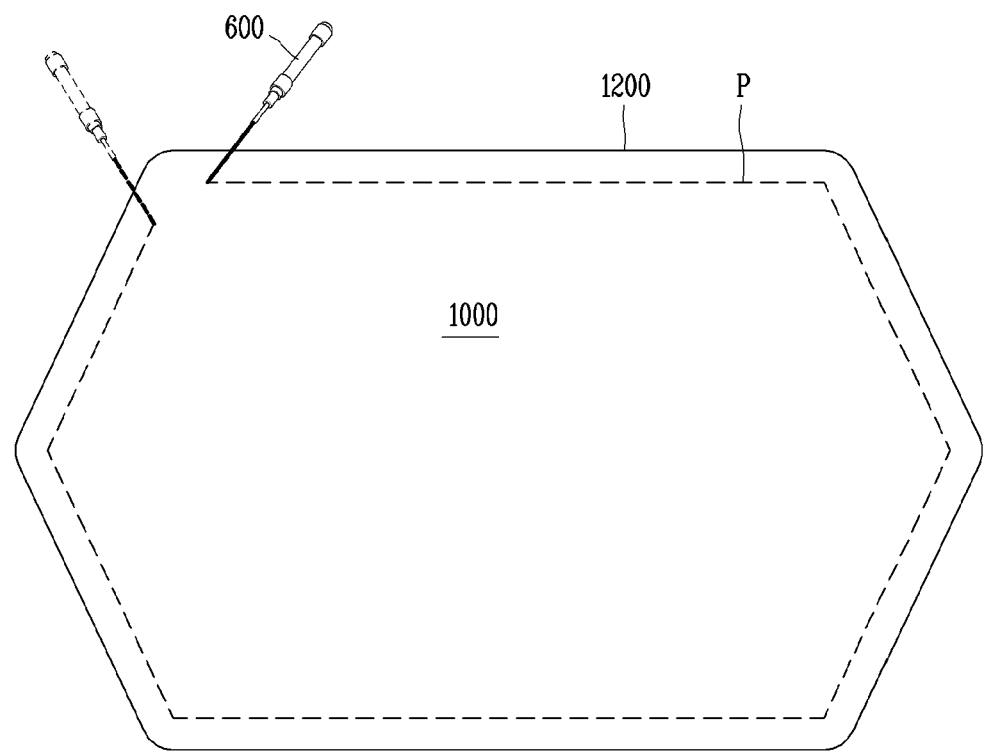
FIG. 10A is Exemplary View A for explaining a boundary information generation process according to an embodiment of the mobile robot system disclosed in the present disclosure.

As such, the robot 100 that recognizes the coordinate information of the irradiation point may recognize coordinate information of each of a plurality of irradiation points corresponding to the path P based on the reception result and the measurement result while the measurement signal is irradiated to the path P, thereby generating the boundary information based on the recognition result. That is, as illustrated in FIG. 10A, the robot 100 may receive the reception result and the measurement result at each of the plurality of irradiation points on the path P from the receiving device 600 while the measurement signal is irradiated to the path P by the receiving device 600 to recognize the coordinate information of each of the plurality of irradiation points based on the reception result and the measurement result, thereby generating the boundary information. Accordingly, the robot 100 may set the boundary region 1200 along the path P designated through the receiving device 600.

The robot 100 may arrange points corresponding to coordinate information included in the recognition result on one coordinate plane, and connect points connectable with one line among the arranged points to generate the boundary information. That is, the robot 100 may recognize the coordinate information of each of the plurality of points, and then arrange points corresponding to the coordinate information on one coordinate plane to connect connectable points with one line, thereby generating the boundary information along the path P. In this case, the robot 100 may connect the points corresponding to the coordinate information with one line to preferably define a closed curve. Accordingly, the setting of the boundary region 1200 along the path P may be easily carried out.

Figure 10B:
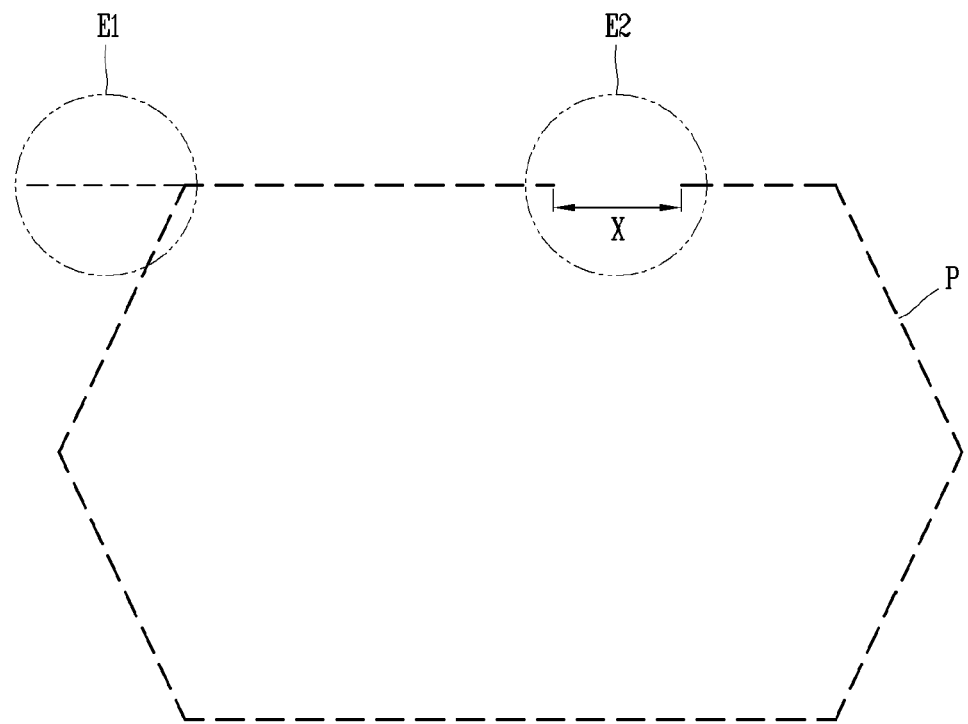
FIG. 10B is Exemplary View B for explaining a boundary information generation process according to an embodiment of the mobile robot system disclosed in the present disclosure.

The robot 100 may connect points that are not continuous by a predetermined interval or more, except for points that cannot be connected with one line among the arranged points, to generate the boundary information. That is, the robot 100 may arrange points corresponding to the coordinate information included in the recognition result on one coordinate plane, and then connect points that are not continuous by a predetermined interval or more, except for points that cannot be connected with one line among the arranged points, thereby correcting/compensating the recognition result to generate the boundary information. For instance, as illustrated in FIG. 10B, the boundary information may be generated through a correction process of connecting points E2 that are not continuous by a predetermined interval or more, except for points E1 that cannot be connected with one line As such, the robot 100 that generates the boundary information may store an image of each process of generating the boundary information from the recognition result. That is, the robot 100 may arrange points corresponding to the coordinate information included in the recognition result on one coordinate plane, and then connect points that are not continuous by a predetermined interval or more, except for points that cannot be connected with one line among the arranged points to store an image of each process of generating the boundary information in the form of image data. For instance, as illustrated in FIG. 10B, each of the images in which the generation of the boundary information is completed before and after correcting/compensating the recognition result may be stored in the storage unit 15. Through this, the correction of the boundary information may be carried out while comparing it with stored data during the resetting of the boundary region 1200 using the receiving device 600 or matching to position information received from the terminal 300 or the GPS 400 may be easily carried out.

As described above, in the system 1, the robot 100 may generate the boundary information along the path P irradiated to the ground surface of the driving region 1000 by the receiving device 600, thereby arbitrarily and simply performing the setting of the boundary region 1200 through the receiving device 600.

The system 1 as described above may be implemented by applying a method of generating boundary information of a mobile robot system to be described below (hereinafter, referred to as a generation method).

The generation method, which is a method for generating the boundary information in the foregoing system 1, may be applied to the foregoing system 1, and may also be applied to another system other than the foregoing the system 1.

The generation method, which is a method of generating the boundary information in the system 1 including the plurality of transmitters 200, the receiving device 600, and the robot 100, as illustrated in FIG. 11, includes irradiating the measurement signal to an arbitrary path on the ground surface (S10), transmitting, by the receiving device 600, the reception result and the measurement result to the robot 100 during the irradiating step (S20), recognizing, by the robot 100, the coordinate information of each of a plurality of irradiation points corresponding to the path based on the reception result and the measurement result (S30), and generating, by the robot 100, the boundary information based on the recognition result of the coordinate information (S40).

That is, the generation of the boundary information in the system 1 may include the irradiating step (S10), the transmitting step (S20), the recognizing step (S30), and the generating step (S40). Accordingly, in the system 1, the generation of the boundary information may be carried out in the order of the irradiating step (S10), the transmitting step (S20), the recognizing step (S30), and the generating step (S40).

As such, in the system 1 in which the generation method is performed, the receiving device 600 may include the first tag 611 provided at one side to receive the transmission signal from the one side, and the second tag 612 provided at the other side to receive the transmission signal from the other side. Accordingly, the reception of the transmission signal in the receiving device 600 may be carried out at each of the first tag 611 and the second tag 612 provided at different positions of the receiving device 600.

The irradiating step (S10) may be a step in which the measurement signal irradiated from the receiving device 600 is irradiated to the path (P).

In the irradiating step S10, the receiving device 600 may be operated by the user of the system 1, and the measurement signal may be continuously emitted along the path P.

In the irradiating step (S10), while the measurement signal is continuously emitted to the path P by the receiving device 600, the receiving device 600 may receive the transmission signal in real time, and measure the distance in real time.

The transmitting step (S20) may be a step of transmitting the reception result and the measurement result to the robot 100 while performing, by the receiving device 600, the irradiating step (S10).

In the transmitting step (S20), the receiving device 600 may transmit the reception result and the measurement result to the robot 100 in real time. Accordingly, the robot 100 may receive the reception result and the measurement result from the receiving device 600 in real time while the measurement signal is irradiated to the path P.

The recognizing step (S30) may be a step of detecting coordinate values of each of a plurality of irradiation points included in the path P based on the measurement result and the reception result received by the robot 100 in real time from the receiving device 600 to recognize coordinate information of the plurality of irradiation points corresponding to the path P based on the detection result.

In the recognizing step (S30), the robot 100 may determine the position information at which each of the plurality of receiving tags 610 has received the transmission signal based on the reception result to detect the irradiation direction based on the position information. That is, the robot 100 may detect a direction of the receiving device 600, that is, an irradiation direction in which the measurement signal is irradiated to the ground surface using positions of the first tag 611 and the second tag 612, which are respectively provided at different positions of the receiving device 600, but provided at positions corresponding to the same straight line with respect to the distance sensor 620.

In the recognizing step (S30), the robot 100 may calculate coordinate values according to the measurement result using the irradiation direction, and reflect a separation length (offset) between a tag adjacent to the distance sensor 620 among the plurality of receiving tags 610 and the distance sensor 620 to the coordinate values to recognize the coordinate information. That is, the robot 100 may calculate coordinate values of the irradiation point based on the irradiation direction and the measurement result, and reflect a separation length (offset) between the first tag 611 and the distance sensor 620 to the coordinate values to recognize the coordinate information, thereby accurately recognizing the position of the irradiation point.

The generating step (S40) is a step of generating, by the robot 100, the boundary information corresponding to the path (P) to which the measurement signal is continuously emitted based on the recognition result in the recognizing step (S30).

In the generating step (S40), the robot 100 may arrange points corresponding to coordinate information included in the recognition result on one coordinate plane, and connect points connectable with one line among the arranged points to generate the boundary information. That is, the robot 100 may recognize the coordinate information of each of the plurality of points, and then arrange points corresponding to the coordinate information on one coordinate plane to connect connectable points with one line, thereby generating the boundary information along the path P.

In the generating step (S40), the robot 100 may connect points that are not continuous by a predetermined interval or more, except for points that cannot be connected with one line among the arranged points, to generate the boundary information. That is, the robot 100 may arrange points corresponding to the coordinate information included in the recognition result on one coordinate plane, and then connect points that are not continuous by a predetermined interval or more, except for points that cannot be connected with one line among the arranged points, thereby correcting/compensating the recognition result to generate the boundary information.

The generation method as described above may further include storing an image of each process of generating the boundary information from the recognition result.

The storing step may be a step of storing image data of each process in which the robot 100 generates the boundary information from the recognition result in the storage unit 15. That is, the robot 100 may arrange points corresponding to the coordinate information included in the recognition result on one coordinate plane, and then connect points that are not continuous by a predetermined interval or more, except for points that cannot be connected with one line among the arranged points to store images of each process of generating the boundary information in the form of image data.

The generation method including the irradiating step (S10), the transmitting step (S20), the recognizing step (S30), and the generating step (S40) may be implemented as codes readable by a computer on a medium written by a program. The computer readable medium includes all types of recording devices in which data readable by a computer system is stored. Examples of the computer-readable medium may include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may include the control unit 20.

A mobile robot system and a method of generating boundary information of the mobile robot system as described above will be applied and implemented to a lawn mower robot, a control method of the lawn mower robot, a control element of the lawn mower robot, a lawn mower robot system, and a method of setting a boundary region of the lawn mower robot, a method of generating/acquiring boundary information of the lawn mower robot system, and the like. However, the technology disclosed in this specification will not be limited thereto, and will be applied and implemented to all mobile robots, control means of controlling a mobile robot, mobile robot systems, methods of controlling a mobile robot, and the like, to which the technical concept of the technology is applicable.

Although a specific embodiment has been described so far, various modifications may of course be made thereto without departing from the scope of the present disclosure. Therefore, the scope of the present disclosure should not be limited to the described embodiments and should be defined by the claims to be described later as well as the claims and equivalents thereto.

BRIEF DESCRIPTION OF REFERENCE NUMERALS

1: Mobile robot system 10: Main body
11: Driving unit 12: Communication unit
20: Controller 30: Weeding unit
100: Mobile robot 200: Transmitter
300: Terminal 400: GPS satellite
600: Signal receiving device
610: Receiving tag (611: First tag; 612: Second tag)
620: Distance sensor 630: Communication module
1000: Driving region 1200: Boundary region

The invention claimed is:
1. A mobile robot system comprising:
a plurality of transmitters installed in a boundary region of a driving region to transmit transmission signals;
a signal receiving device that receives the transmission signal transmitted from each of the plurality of transmitters, and measures a distance to an irradiation point to which a measurement signal is irradiated based on a result of irradiating the measurement signal on a ground surface of the driving region; and
a mobile robot that receives a reception result of the transmission signal and a measurement result of the distance from the signal receiving device to generate boundary information of the driving region in response to a path to which the measurement signal is irradiated on the ground surface based on the reception result and the measurement result,
wherein the signal receiving device comprises:
a plurality of receiving tags provided at different positions to receive the transmission signal;
a distance sensor that irradiates the measurement signal on the ground surface to measure the distance based on the irradiation result; and
a communication module that transmits a reception result of each of the plurality of receiving tags and a measurement result of the distance sensor to the mobile robot,
wherein the mobile robot comprises:
a driving unit that moves a main body of the mobile robot;
a communication unit that communicates with a communication target element; and
a controller that generates information and control commands for controlling operation of the mobile robot and controls the driving unit and the communication unit to control operation of the mobile robot,
wherein the plurality of receiving tags comprise:
a first tag provided at one side of the signal receiving device; and
a second tag provided at another side of the signal receiving device,
wherein the distance sensor is provided at one side of the signal receiving device,
wherein the first tag and the second tag are provided at positions corresponding to a same straight line as the distance sensor,
wherein the mobile robot receives the reception result and the measurement result from the communication module through the communication unit and generates the boundary information by the controller,
wherein when the measurement signal is continuously emitted to an arbitrary path along the boundary region by the signal receiving device, the mobile robot receives the reception result and the measurement result while the measurement signal is continuously emitted to the path, recognizes coordinate information of the irradiation point based on the reception result and the measurement result to generate the boundary information using the coordinate information, and
wherein the controller sets the boundary region based on the boundary information, sets at least an area of an inner area of the boundary region as the driving region, and controls the driving of the mobile robot to be driven within the driving region so as not to deviate from the boundary region.
2. The mobile robot system of claim 1, wherein the plurality of transmitters are dispersedly installed in the boundary region.

3. The mobile robot system of claim 1, wherein the signal receiving device is detachably attached to the mobile robot.

4. The mobile robot system of claim 1, wherein the communication module transmits the reception result and the measurement result to the mobile robot in real time.

5. The mobile robot system of claim 1, wherein the mobile robot detects an irradiation direction of the measurement signal based on the reception result to recognize the coordinate information based on the irradiation direction and the measurement result.

6. The mobile robot system of claim 5, wherein the mobile robot determines position information at which each of the plurality of receiving tags has received the transmission signal based on the reception result to detect the irradiation direction based on the position information.

7. The mobile robot system of claim 5, wherein the mobile robot calculates coordinate values according to the measurement result using the irradiation direction, and reflects a separation length between the distance sensor and a tag adjacent to the distance sensor among the plurality of receiving tags to the coordinate values to recognize the coordinate information.

8. The mobile robot system of claim 1, wherein the mobile robot recognizes coordinate information of each of a plurality of irradiation points corresponding to the path based on the reception result and the measurement result while the measurement signal is irradiated to the path to generate the boundary information based on the recognition result.

9. The mobile robot system of claim 8, wherein the mobile robot arranges points corresponding to coordinate information included in the recognition result on one coordinate plane, and connects points connectable with one line among the arranged points to generate the boundary information.

10. The mobile robot system of claim 9, wherein the mobile robot connects points that are not continuous by a predetermined interval or more, except for points that cannot be connected with one line among the arranged points, to generate the boundary information.

11. The mobile robot system of claim 9, wherein the mobile robot stores an image of each process of generating the boundary information from the recognition result.

12. A method of generating boundary information in a mobile robot system, the mobile robot system comprising a plurality of transmitters installed in a boundary region of a driving region to transmit transmission signals; a signal receiving device that receives the transmission signal transmitted from each of the plurality of transmitters, and measures a distance to an irradiation point to which a measurement signal is irradiated based on a result of irradiating the measurement signal on a ground surface of the driving region; and a mobile robot that receives a reception result of the transmission signal and a measurement result of the distance from the signal receiving device to generate boundary information of the driving region based on the reception result and the measurement result, the method comprising:
irradiating the measurement signal to an arbitrary path on the ground surface;
transmitting, by the signal receiving device, the reception result and the measurement result to the mobile robot during the irradiating step;
recognizing, by the mobile robot, coordinate information of each of a plurality of irradiation points corresponding to the path based on the reception result and the measurement result; and
generating, by the mobile robot, the boundary information based on the recognition result of the coordinate information,
wherein the signal receiving device comprises:
a plurality of receiving tags provided at different positions to receive the transmission signal;
a distance sensor that irradiates the measurement signal on the ground surface to measure the distance based on the irradiation result; and
a communication module that transmits a reception result of each of the plurality of receiving tags and a measurement result of the distance sensor to the mobile robot,
wherein the mobile robot comprises:
a driving unit that moves a main body of the mobile robot;
a communication unit that communicates with a communication target element; and
a controller that generates information and control commands for controlling operation of the mobile robot and controls the driving unit and the communication unit to control operation of the mobile robot,
wherein the plurality of receiving tags comprises;
a first tag provided at one side to receive the transmission signal from the one side; and
a second tag provided at another side to receive the transmission signal from the other side,
wherein the distance sensor is provided at one side of the signal receiving device,
wherein the first tag and the second tag are provided at positions corresponding to a same straight line as the distance sensor,
wherein the mobile robot receives the reception result and the measurement result from the communication module through the communication unit and generates the boundary information by the controller, and
wherein the controller sets the boundary region based on the boundary information, sets at least an area of an inner area of the boundary region as the driving region, and controls the driving of the mobile robot to be driven within the driving region so as not to deviate from the boundary region.

13. The method of claim 12, wherein the transmitting step is transmitting, by the signal receiving device, the reception result and the measurement result to the mobile robot in real time.

14. The method of claim 12, wherein the generating step is arranging points corresponding to coordinate information included in the recognition result on one coordinate plane, and connecting points connectable with one line among the arranged points to generate the boundary information.

* * * * *